April 18, 1939.　　　J. H. BENSON　　　2,155,003
EVAPORATOR
Filed May 17, 1935　　　3 Sheets-Sheet 2

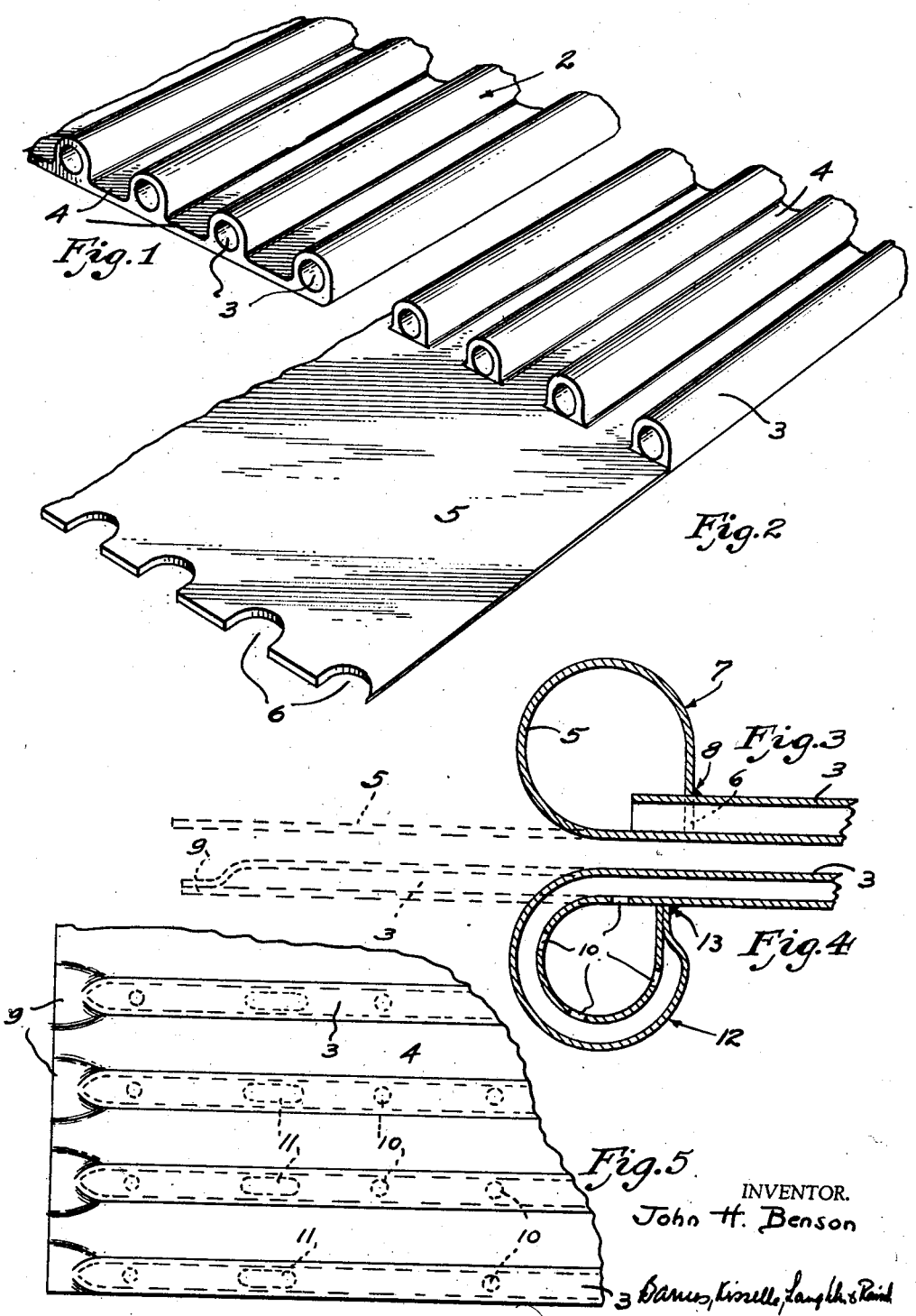

INVENTOR.
John H. Benson
BY
ATTORNEYS

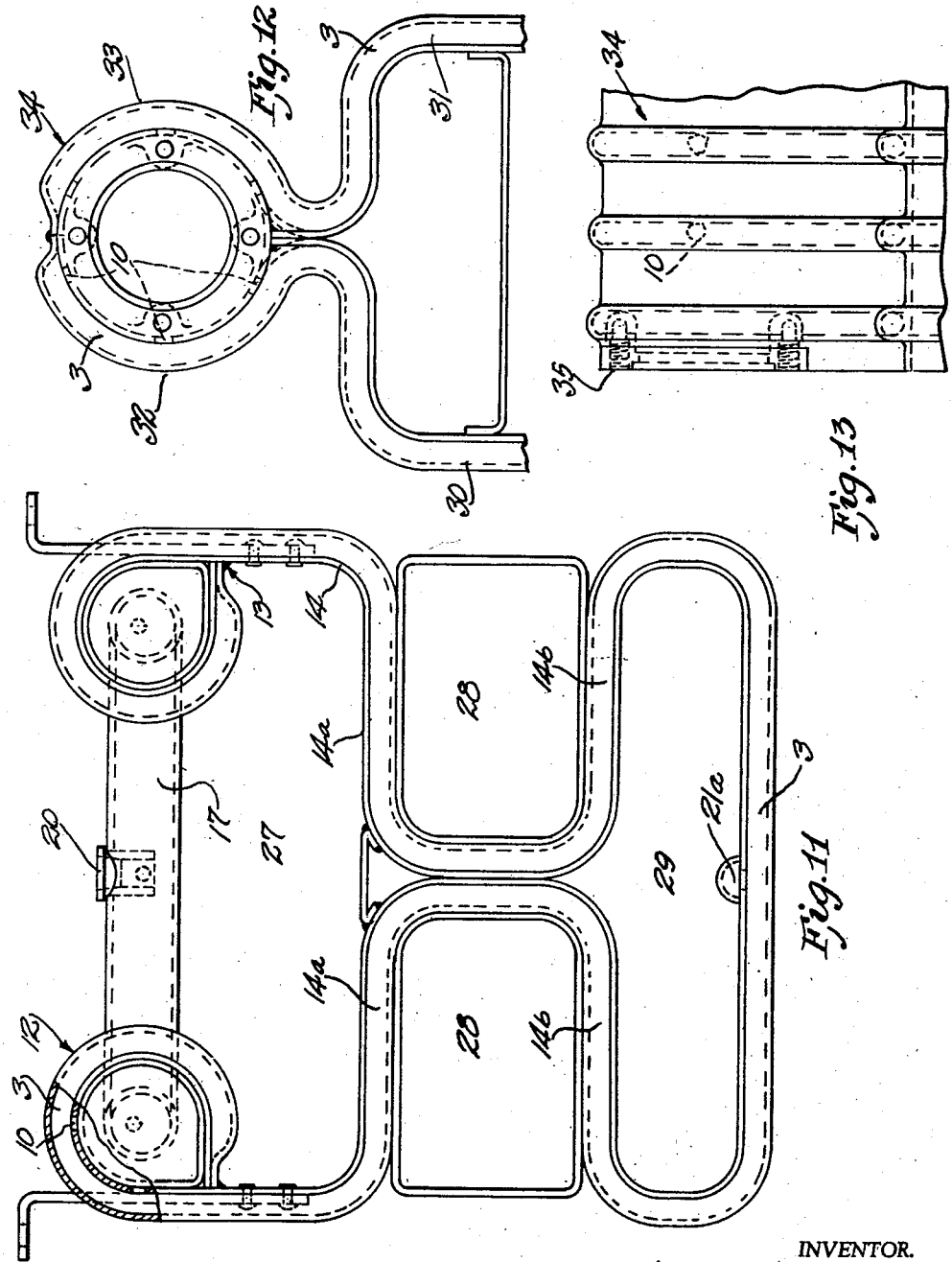

Patented Apr. 18, 1939

2,155,003

UNITED STATES PATENT OFFICE 2,155,003

EVAPORATOR

John H. Benson, Salem, Ohio, assignor to Mullins Manufacturing Corporation, Salem, Ohio, a corporation of New York Application May 17, 1935, Serial No. 21,917

23 Claims. (Cl. 62—126)

This invention relates to evaporators, and has to do particularly with evaporators of the flooded type utilizing one or more headers.

Heretofore in the forming of flooded evaporators, the art has generally developed from evaporators of the header type with depending separate coils to sheet metal evaporators where the circulating walls of the sharp freezing chamber are formed of inner and outer shells of sheet metal, one or both of these shells being usually continued to form the header portions.

It is the object of the present invention to provide an improved form of sheet metal evaporator wherein the circulating or sharp freezing walls of the evaporator are formed of an extruded sheet of metal, such sheet being so fabricated in a novel manner as to form one or more headers; in other words, my flooded evaporator is formed of a single extruded section of metal, the greater portion of which is formed with integral passageways for circulating refrigerant and another extended portion of which sheet is fabricated to form a header in direct communication with the passageways in the same sheet. Detailed features of my invention have to do with the manner of preforming this extended section by the extruded section, the manner of forming the same into a header or headers and various methods of fabrication and sealing, as will be more clearly set forth in the specification and claims.

In the drawings:

Fig. 1 is a fragmentary perspective view of an extruded section of metal as it comes from the extruding dies preparatory to being fabricated for forming the complete evaporator.

Fig. 2 illustrates the first step of fabrication preparatory to one method of forming the header, parts of the integral conduits being milled or cut away and suitable slots being cut in the end of the sheet.

Fig. 3 illustrates the second step wherein the flat portion of the extruded section is curled over and the ends welded around the conduits to form a header.

Fig. 4 illustrates another method of forming a header wherein the end of the sheet is flattened as shown in dotted lines and then curled over and welded as shown in solid lines.

Fig. 5 is a plan view of the sheet shown in Fig. 4 before curling.

Fig. 11 is a front view of a modified form of evaporator structure having a plurality of vertically spaced sharp freezing chambers.

Fig. 12 illustrates a further modified form of evaporator fabrication of the single header type wherein a portion of the header is formed by the respective ends of the single sheet.

Fig. 13 is a fragmentary side elevation of the header of the evaporator shown in Fig. 12.

Figure 6:
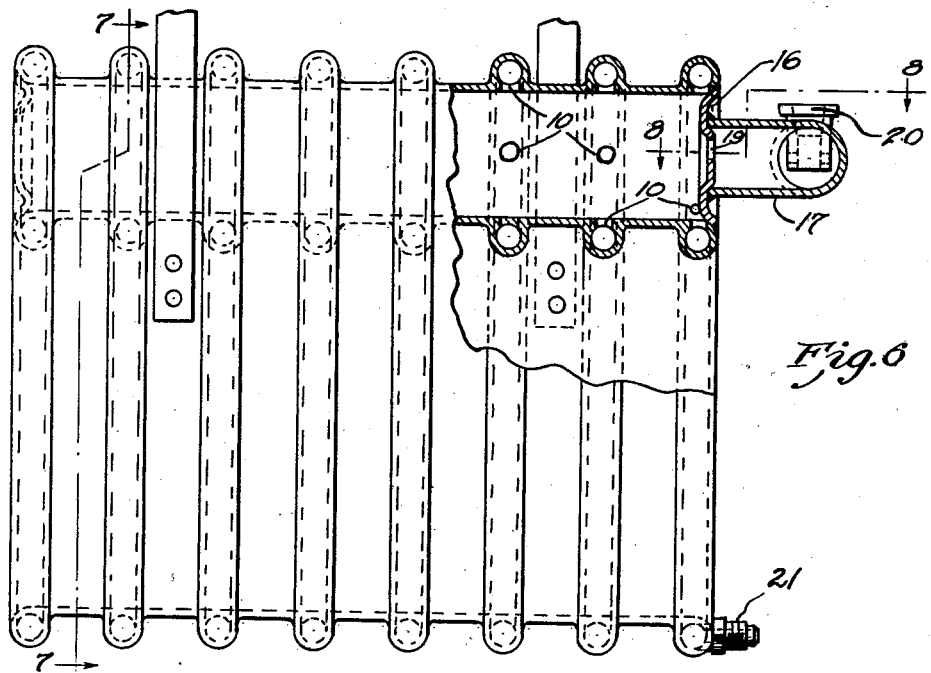
Fig. 6 is an elevation, partly cut away, of a double header type of evaporator, fabricated according to the method illustrated in Fig. 4.

In carrying out the invention I preferably utilize an extruded sheet of metal such as shown at 2 of the type wherein conduits 3 are formed integrally in the sheet and separated by webs 4. It will be understood here that such conduits or web sections may be of various shapes, depending upon the circulation, effective surface area, etc., as desired. Any extruded metal may be utilized and aluminum has been found to be most practical; the extrusion of the aluminum refines the grain and makes the same impervious to refrigerant gases. Aluminum is light weight, has a finish needing very little subsequent treating and extruded aluminum bends very easily, although when once bent it is quite rigid in its new shape.

In one form of fabricating a header for use with evaporators of the two header type, I mill away the ends of the conduits 3, as shown in Fig. 2, to leave a flat sheet 5. The ends of this flat sheet are in turn cut away as at 6 to form openings which are shaped corresponding to the cross sectional contour of the conduits 3. As the next step, this flat portion 5 is bent back or curled, as shown in solid lines in Fig. 3, so as to form a header member 7. The cut away portions 6 fit snugly around the conduits 3 and the entire peripheral joint is welded as at 8. In this manner the principal part of the evaporator is formed from a single sheet of metal, conduits, fins, webs, etc., being formed integrally and the header being made of the same sheet of metal. All fitting and welding together of two parts is eliminated.

Another method of forming an evaporator header as an integral part of the extended side walls is shown in Figs. 4 and 5. Here the conduits or corrugations 3 are not milled off but instead extend all the way around the header. The ends of the conduits are flattened as at 9 to close the open end of the tubular passageways. Holes 10 or slots 11 are multiple drilled in the inner walls of the conduits and so located that when the end portion of the extruded section is curled over to form the header member 12, as shown in Fig. 4, the holes 10 are positioned within the header. By flattening the ends 9 of the conduits and curling over the end of the section to form a header 12, it will be seen that the header portion will be formed and sealed by a simple line weld 13. The holes 10 or 11 thus form small connecting passageways between the main conduits 3 and the interior of the header 12. The liquid within a header of this type will be comparatively quiet as the gas boiling up through the corrugations 3 will pass on up into the conduit portions which encircle the header, thus not causing violent agitation within the header itself. The inner wall of the header, with the holes 10, thus forms a baffle to the uprising gas.

Figure 7:
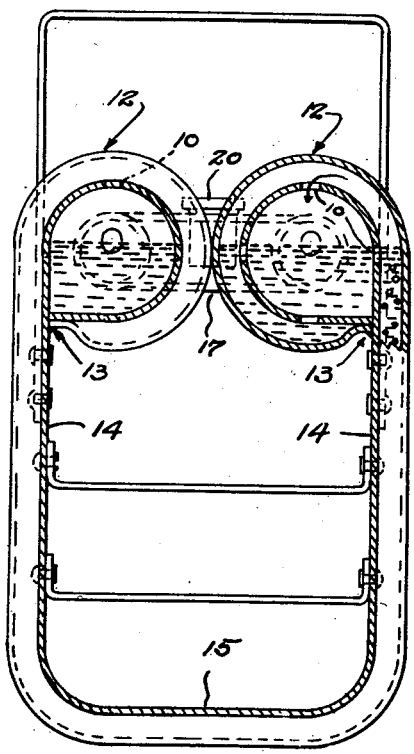
Fig. 7 is a sectional view taken on line 7—7 of Fig. 6, one conduit of one header being shown in elevation and a conduit of the other header being shown in section.

With each end of the extruded sheet formed with the header as shown in Fig. 4 or in Fig. 3, the only forming operation necessary is that which determines the dimensions of the side and bottom walls of the evaporator, such as shown at 14 and 15, respectively, in Fig. 7. It will be obvious that any depth or width of sharp freezing chamber may be formed from the same flat sheet.

Figure 8:
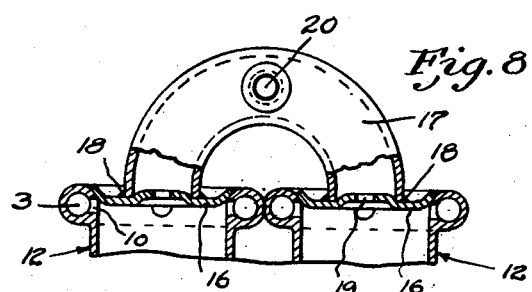
Fig. 8 is a sectional view taken on line 8—8 of Fig. 6 illustrating one method of capping in the ends of the header and connecting the same.

In the forming of an evaporator such as shown in Figs. 6 and 7, there will be no weld around the edges or no welding between the corrugations, just the straight line weld 13 and the welding in of the caps for the header. One form of cap is shown as at 16 in Figs. 6 and 8, such caps being welded around their periphery to the end of the headers 12. One method of connecting the headers of a two header type of evaporator as shown in Figs. 6, 7 and 8, is by means of a U-conduit 17, the ends of which are welded as at 18 to the respective header caps. Apertures 19 are formed in the caps 16 to allow the escape of gas from the header through the outlet conduit 20. Entrance to the evaporator may be through the inlet fitting 21.

Figure 9:
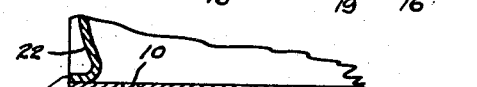
Fig. 9 is a fragmentary sectional view showing a modified header cap construction.
Figure 10:
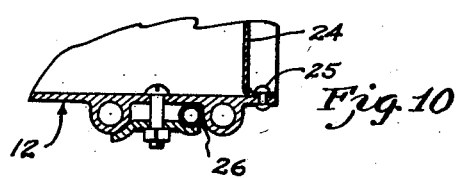
Fig. 10 illustrates a further modified construction particularly adapted for the back plate of the evaporator, also illustrating the manner of positioning the thermostatic control bulb.

A modified form of header cap construction is shown in Fig. 9 wherein a header cap 22 is flanged as at 23 whereby to permit fusing of the edges to seal the header. A possible back construction is shown in Fig. 10 wherein a back plate 24 may be riveted in place as at 25. In this modification I have also illustrated one manner of clamping thermostatic bulbs 26 and the like to the side wall of the evaporator.

In Fig. 11 I have illustrated a modification wherein the sharp freezing walls of the evaporator are much longer than that shown in Fig. 7. In this modification the side walls 14 are bent inwardly as at 14a and then outwardly as at 14b to form vertically spaced sharp freezing compartments 27, 28 and 29. In this form an inlet manifold 21a preferably extends lengthwise across the bottom of the sharp freezing compartments and connects to each one of the corrugations 3.

While the preferred form of evaporator construction utilizing extruded metal is of the double header type, it is possible to form a single header evaporator wherein the outer corrugations of the side walls 30 and 31 are arcuately spaced at 32 and 33 to each form a part in forming the header generally designated 34. The corrugations 3 extend around and to the top of the header 34 and the inner wall of the extruded sheet which forms the header portion is provided with holes 10 to connect the conduits 3 with the interior of the header. In this form, the same as in the double header evaporator, the gas can enter the header through the holes in the top and thus not disturb the liquid in the header. I have shown the header 34 as being provided with a tapped ring 35 for the reception of a removable header cap which may be provided with the ordinary inlet and outlet fittings. However, it will be understood that this single header may have a welded end cap for use with capillary tubes or high side floats.

What I claim is:

1. As a new article of manufacture, a refrigerant evaporator having refrigerant circulating and spreading means formed integrally of a sheet of extruded metal and shaped to form the main part of a liquid and gas chamber and one or more sharp freezing chambers.

2. As a new article of manufacture, a refrigerant evaporator having refrigerant circulating and spreading means formed integrally of a sheet of extruded metal and shaped to form the main part of a liquid and gas chamber and one or more sharp freezing chambers, the walls of said chambers including conduits connecting directly with the interior of said liquid and gas chamber.

3. As a new article of manufacture, a refrigerant evaporator having refrigerant circulating and spreading walls formed integrally of a sheet of non-ferrous metal and shaped to form the main part of a liquid and gas chamber and one or more sharp freezing chambers, said walls including a plurality of conduits formed in said non-ferrous metal.

4. As a new article of manufacture, a refrigerant evaporator having refrigerant circulating and spreading means formed integrally of a sheet of thin walled extruded aluminum and shaped to form the main part of a liquid and gas chamber and one or more sharp freezing chambers, and a plurality of conduits formed in said extruded metal.

5. As a new article of manufacture, a refrigerant evaporator having refrigerant circulating and spreading means formed integrally of a sheet of extruded metal and shaped to form the main part of a liquid and gas chamber and walls bent to form one or more sharp freezing chambers, and including a plurality of conduits formed in said extruded metal and extending around walls of the sharp freezing chamber or chambers and the liquid and gas chamber.

6. As a new article of manufacture, a refrigerant evaporator having refrigerant circulating and spreading means formed integrally of a sheet of extruded metal and shaped to form the main part of a liquid and gas chamber and the walls of a sharp freezing chamber, and including a plurality of conduits formed in said extruded metal and extending around walls of the sharp freezing chamber and the liquid and gas chamber, and one or more apertures in the walls of the conduits surrounding said liquid and gas chamber and connecting the interior of the liquid and gas chamber with one or more conduits.

7. As a new article of manufacture, a refrigerant evaporator having refrigerant circulating and spreading walls formed integrally of a sheet of extruded metal and shaped to form the main part of a liquid and gas chamber and one or more sharp freezing chambers, said walls comprising a plurality of conduits formed in said extruded metal and extending around walls of the sharp freezing chamber and the liquid and gas chamber, and one or more apertures in the walls forming said liquid and gas chamber and connecting the interior of the liquid and gas chamber with one or more conduits, said aperture or apertures being so positioned that the walls surrounding the liquid and gas chamber act as baffles.

8. As a new article of manufacture, a refrigerant evaporator formed of extruded metal and including refrigerant circulating and spreading means in the general form of a single sheet and shaped to form the main walls of a sharp freezing chamber, and including a plurality of conduits integrally formed in said sheet, at least one of the ends and said sheet extending past and being bent away from the general plane of one of the walls of said chamber to form at least one header.

9. As a new article of manufacture, a refrigerant evaporator formed of extruded metal and including refrigerant circulating and spreading means in the general form of a single sheet and shaped to form the main walls of a sharp freezing chamber, and including a plurality of conduits integrally formed in said sheet, at least one of the ends of said sheet including the conduits extending past one of the main walls defining said chamber and being shaped to form at least one header.

10. As a new article of manufacture, a refrigerant evaporator formed of extruded metal and including refrigerant circulating and spreading means in the general form of a single sheet and shaped to form the main walls of a sharp freezing chamber, and including a plurality of conduits integrally formed in said sheet, at least one of the ends of said sheet including the conduits being shaped to form at least one header at the end of one of said walls, and one or more apertures in the inner wall of the header for connecting the interior of the header with the conduits.

11. As a new article of manufacture, a refrigerant evaporator formed of extruded metal and including refrigerant circulating and spreading means in the general form of a single sheet and shaped to form the main walls of a sharp freezing chamber, and including a plurality of conduits integrally formed in said sheet, at least one of the ends of said sheet being extended past one of said walls and shaped to form a header.

12. As a new article of manufacture, a refrigerant evaporator formed of extruded metal and including refrigerant circulating and spreading means in the general form of a single sheet and shaped to form the main walls of a sharp freezing chamber, and including a plurality of conduits integrally formed in said sheet, at least one of the ends of said sheet including the conduits being extended past one of said walls and shaped to form a header.

13. As a new article of manufacture, a refrigerant evaporator formed of extruded metal and including refrigerant circulating and spreading means in the general form of a single sheet and shaped to form the main walls of a sharp freezing chamber, and including a plurality of conduits integrally formed in said sheet, at least one of the ends of said sheet including the conduits being extended past one of said walls to form a header, and one or more apertures in the extended header, and one or more apertures in the extended portions for connecting the interior of the header with the conduits.

14. A sheet metal heat exchange unit comprising walls bent to form one or more sharp freezing chambers, conduits formed in said sheet metal walls for circulating a heat exchange medium, the end of one of said sheet metal walls including the conduits being curled over upon itself to form a header chamber, and one or more apertures in the inner wall of said turned over portion for connecting the interior of said header with said conduits.

15. The method of forming heat exchange units of the class described which comprises extruding a relatively flat section of metal with integrally and simultaneously formed conduits therein, bending one end of said section upon itself to form a liquid receiving chamber, sealing the bent over portion at its point of contact with the main section, and sealing the ends thereof to complete the heat exchange unit.

16. The method of forming heat exchange units of the class described which comprises extruding a relatively flat section of metal with integrally formed conduits therein, and bending one end of the said section transversely of the conduits to form a liquid receiving chamber defined by the inner wall of the bent over section.

17. As a new article of manufacture, a sheet metal evaporator having side walls and conduits formed therein, the ends of said walls and conduits being turned over to form headers, at least one opening connecting the conduits surrounding the headers with the headers, cap members in the ends of said headers, and a conduit for connecting said cap members to place said headers in constant communication.

18. A header construction forming part of a refrigerant evaporator comprising a wall bent to form the main portion of a liquid and gas chamber, portions of said wall being spaced from each other to form one or more refrigerant passageways and one or more openings formed in said spaced portions for connecting said liquid and gas chamber with said passageway or passageways.

19. A header construction forming part of a refrigerant evaporator comprising a wall bent to form the main portion of a liquid and gas chamber, portions of said wall being spaced from each other to form one or more refrigerant passageways and one or more openings formed in said spaced portions for connecting said liquid and gas chamber with said passageway or passageways, at least one of said openings being positioned above the normal height of the liquid refrigerant.

20. A header construction forming part of a refrigerant evaporator comprising a wall bent to form the main portion of a liquid and gas chamber, portions of said wall being spaced from each other to form one or more refrigerant passageways and openings formed in one of said spaced portions for connecting said liquid and gas chamber with said passageway or passageways, at least one of said openings being positioned above the normal height of the liquid refrigerant in said liquid and gas chamber and said passageway or passageways.

21. The method of making a cooling unit structure which comprises bending an extruded one piece metallic element having a plurality of substantially parallel conduits therein, to form the walls of a sharp freezing compartment and further bending the element to form the walls of a chamber for receiving liquid refrigerant.

22. The method of making a cooling unit structure which comprises fabricating the end of an extruded one piece metallic element having a plurality of substantially parallel conduits therein to form an attaching surface, bending the element to form the walls of a sharp freezing compartment and further bending the element including the fabricated end to form the walls of a chamber for receiving liquid refrigerant.

23. In an evaporator a header construction of the liquid and gas type comprising a main header wall defining a main liquid and gas chamber, an inner surface of said wall defining said liquid and gas chamber one or more conduits in said wall so positioned as to normally fill the main liquid and gas chamber with a predetermined amount of liquid refrigerant, and one or more conduits leading from said first named conduits and connecting into said main liquid and gas chamber at a point above the normal liquid level therein.

JOHN H. BENSON.